(12) United States Patent
Suzuki

(10) Patent No.: US 11,019,235 B2
(45) Date of Patent: May 25, 2021

(54) IMAGE PROCESSING CONTROL AND COLOR ADJUSTMENT FOR REPRODUCING ORIGINALS WITH SPOT COLORS OR DECORATIVE ATTRIBUTES USING A COLOR SAMPLE

(71) Applicant: KONICA MINOLTA, INC., Tokyo (JP)

(72) Inventor: Naoyo Suzuki, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/930,550

(22) Filed: May 13, 2020

(65) Prior Publication Data
US 2020/0412915 A1 Dec. 31, 2020

(30) Foreign Application Priority Data
Jun. 25, 2019 (JP) .............................. JP2019-116845

(51) Int. Cl.
*H04N 1/60* (2006.01)
*H04N 1/00* (2006.01)

(52) U.S. Cl.
CPC ....... *H04N 1/6016* (2013.01); *H04N 1/00442* (2013.01); *H04N 1/6008* (2013.01);
(Continued)

(58) Field of Classification Search
CPC ........... H04N 1/00015; H04N 1/00023; H04N 1/00034; H04N 1/00045; H04N 1/00068; H04N 1/00074; H04N 1/00076; H04N 1/00082; H04N 1/00087; H04N 1/0044; H04N 1/00442; H04N 1/6008; H04N 1/6011; H04N 1/6016; H04N 1/6027; H04N 1/6038; H04N 1/6047; H04N 1/6072;
(Continued)

(56) References Cited

U.S. PATENT DOCUMENTS 8,482,785 B2 7/2013 Aoki
9,684,856 B2 6/2017 Suzuki
(Continued)

FOREIGN PATENT DOCUMENTS

JP H09321984 A 12/1997
JP 2006287360 A 10/2006

*Primary Examiner* — Scott A Rogers
(74) *Attorney, Agent, or Firm* — Holtz, Holtz & Volek PC

(57) ABSTRACT

An image processing control apparatus includes a hardware processor. The hardware processor obtains: read image data obtained through reading a color sample and shown in a first color system; original image data corresponding to the color sample and shown in a second color system; and region-by-attribute information indicating a first region corresponding to spot-color printing and a second region corresponding to decoration printing, the first and second regions being in the original image data. The hardware processor determines a color conversion parameter for color conversion of the first region and a color conversion parameter for color conversion of a third region different from the first and second regions in the original image data by using the read image data. The hardware processor determines a color conversion parameter for color conversion of the second region according to predetermined values shown in the second color system.

10 Claims, 6 Drawing Sheets

(52) U.S. Cl.
CPC ......... *H04N 1/6011* (2013.01); *H04N 1/6027* (2013.01); *H04N 1/6038* (2013.01); *H04N 1/6047* (2013.01); *H04N 1/6072* (2013.01)

(58) Field of Classification Search
CPC .. G06K 15/025; G06K 15/026; G06K 15/027; G06K 15/1878; G06K 15/188
See application file for complete search history.

(56) References Cited

U.S. PATENT DOCUMENTS

| | | | |
|---|---|---|---|
| 9,948,830 B2 * | 4/2018 | Inamura | ................ H04N 1/605 |
| 10,338,858 B2 | 7/2019 | Suzuki | |
| 2006/0221411 A1 | 10/2006 | Aoki | |
| 2013/0088728 A1 * | 4/2013 | Chen | .................... G06F 3/1254 |
| | | | 358/1.9 |

* cited by examiner

| SPOT-COLOR NAME | C% | M% | Y% | K% |
|---|---|---|---|---|
| SPOT-COLOR 1 | 0.0 | 100.0 | 68.7 | 0.0 |
| SPOT-COLOR 2 | 76.6 | 0.0 | 89.4 | 0.0 |
| SPOT-COLOR 3 | 46.6 | 86.2 | 0.0 | 0.0 |
| SPOT-COLOR 4 | 81.4 | 0.00 | 24.3 | 0.0 |
| ⋮ | | | | |
| ⋮ | | | | |
| ⋮ | | | | |

| DECORATION NAME | C% | M% | Y% | K% |
|---|---|---|---|---|
| GOLD LEAF A | 13.7 | 26.8 | 76.9 | 27.4 |
| SILVER LEAF B | 32.5 | 17.7 | 23.8 | 33.1 |
| GOLD LAMINATE C | 5.8 | 13.1 | 44.0 | 11.5 |
| SILVER LAMINATE D | 35.6 | 13.9 | 9.4 | 16.6 |
| ⋮ | | | | |
| ⋮ | | | | |
| ⋮ | | | | |

IMAGE PROCESSING CONTROL AND COLOR ADJUSTMENT FOR REPRODUCING ORIGINALS WITH SPOT COLORS OR DECORATIVE ATTRIBUTES USING A COLOR SAMPLE

CROSS-REFERENCE TO RELATED APPLICATIONS

The entire disclosure of Japanese Patent Application No. 2019-116845 filed on Jun. 25, 2019 is incorporated herein by reference in its entirety.

BACKGROUND

Technological Field

The present invention relates to an image processing control apparatus, a color adjustment method, and a storage medium.

Description of Related Art

Spot-color printing, decoration printing, and the like have been performed as well as normal printing that uses cyan (C), magenta (M), yellow (Y), and black (K) as process colors. The spot-color printing uses spot-color inks, and the decoration printing uses metal leafs of gold, silver, or other metals to express colors having metallic luster or the like.

However, not many printers have spot-color inks. As spot-color printing and decoration printing are costly, a printer having normal four colors of C, M, Y, and K may be used to perform printing for reproducing the color of a color sample that includes a spot color(s) or metal leafs, without using spot colors or metal leafs. A color sample is a matter printed and output in the past and serves as a target of printing this time.

In order to generate a color profile (color conversion parameter) that realizes better color reproduction of the color sample in printing with a four-color printer, a method of reading the color sample with a scanner is known. More specifically, the color sample is read to obtain read image data, and color values of the read image data are calculated. On the basis of difference between the calculated color values and color values calculated from original image data of the color sample, a color profile is corrected. With the corrected color profile, printing is performed.

However, when a color sample includes a spot color or metal leafs, read image data obtained by the scanner reading the color sample also includes data of a spot-color region or a metal-leaf region. Use of such read image data as it is to correct the color profile leads to low color reproduction accuracy of an output matter with respect to the color sample.

For example, color adjustment for a spot-color region may be performed by using a spot-color table that directly designates specific values of C, M, Y and K (CMYK values), and may be independent from color adjustment that uses a color profile. In such a case, even if the color profile is corrected with the read image data, the color of the spot-color region does not correspond with the color sample. Thus, color reproduction accuracy remains low.

Further, the color of the metal-leaf region in the read image data is recognized as black or white owing to luster on the surface of metal leafs. When the color of the decoration region obtained from the read image data is set as a target color to correct the color profile, the generated color profile may produce an incorrect color that is different from the color sample.

There is proposed an image reading apparatus that performs processing according to types of original sheets. The apparatus determines the type of an original sheet as "picture", "text", or "others", determines an image cropping method according to the type of the original sheet, and executes a color adjusting process according to the type of the original sheet (see JP 2006-287360A).

There is also proposed an image processing apparatus provided with a movable mirror at a movable light source part of an image reading unit. The apparatus obtains, as read image data of a document, regularly reflected light data and irregularly reflected light data, compares these data to distinguish a metal color(s), and reproduces the metal color of the document (see JP 09-321984A).

SUMMARY

However, JP 2006-287360A does not disclose a color adjusting process in a case where the original sheet image includes a spot color(s) or metal leafs. Hence, the technique disclosed therein cannot improve color reproduction when the original sheet image includes a spot color(s) or metal leafs.

Further, the technique disclosed in JP 09-321984A uses a special member (movable mirror) in the image reading unit, and cannot distinguish metal colors with a normal scanner.

There has been awaited a color adjustment method that can obtain, without using a scanner provided with a special member capable of distinguishing metal colors, an output matter having high color reproduction accuracy with respect to the color sample that includes a spot color(s) or metal leafs.

The present invention has been conceived in view of the above issues in the conventional art. Objects of the present invention include restraining decrease of color reproduction accuracy when printing is performed according to a color sample that includes a spot-color(s) or decoration.

To achieve at least one of the abovementioned objects, according to an aspect of the present invention, there is provided an image processing control apparatus including a hardware processor that obtains: read image data obtained through reading a color sample and shown in a first color system; original image data corresponding to the color sample and shown in a second color system; and region-by-attribute information indicating a first region corresponding to spot-color printing and a second region corresponding to decoration printing, the first and second regions being in the original image data, wherein the hardware processor determines a color conversion parameter for color conversion of the first region and a color conversion parameter for color conversion of a third region different from the first and second regions in the original image data by using the read image data, and determines a color conversion parameter for color conversion of the second region according to predetermined values shown in the second color system.

To achieve at least one of the abovementioned objects, according to another aspect of the present invention, there is provided a color adjustment method including: obtaining read image data obtained through reading a color sample and shown in a first color system; obtaining original image data corresponding to the color sample and shown in a second color system; obtaining region-by-attribute information indicating a first region corresponding to spot-color printing and a second region corresponding to decoration printing, the first and second regions being in the original image data; determining a color conversion parameter for color conversion of the first region and a color conversion parameter for color conversion of a third region different from the first and second regions in the original image data by using the read image data; and determining a color conversion parameter for color conversion of the second region according to predetermined values shown in the second color system.

To achieve at least one of the abovementioned objects, according to another aspect of the present invention, there is provided a non-transitory computer-readable storage medium storing a program that causes a computer to perform: obtaining read image data obtained through reading a color sample and shown in a first color system; obtaining original image data corresponding to the color sample and shown in a second color system; obtaining region-by-attribute information indicating a first region corresponding to spot-color printing and a second region corresponding to decoration printing, the first and second regions being in the original image data; determining a color conversion parameter for color conversion of the first region and a color conversion parameter for color conversion of a third region different from the first and second regions in the original image data by using the read image data; and determining a color conversion parameter for color conversion of the second region according to predetermined values shown in the second color system.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein:

FIG. 3 exemplifies a data structure of a spot-color table;

FIG. 4 exemplifies a data structure of a decoration table;

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
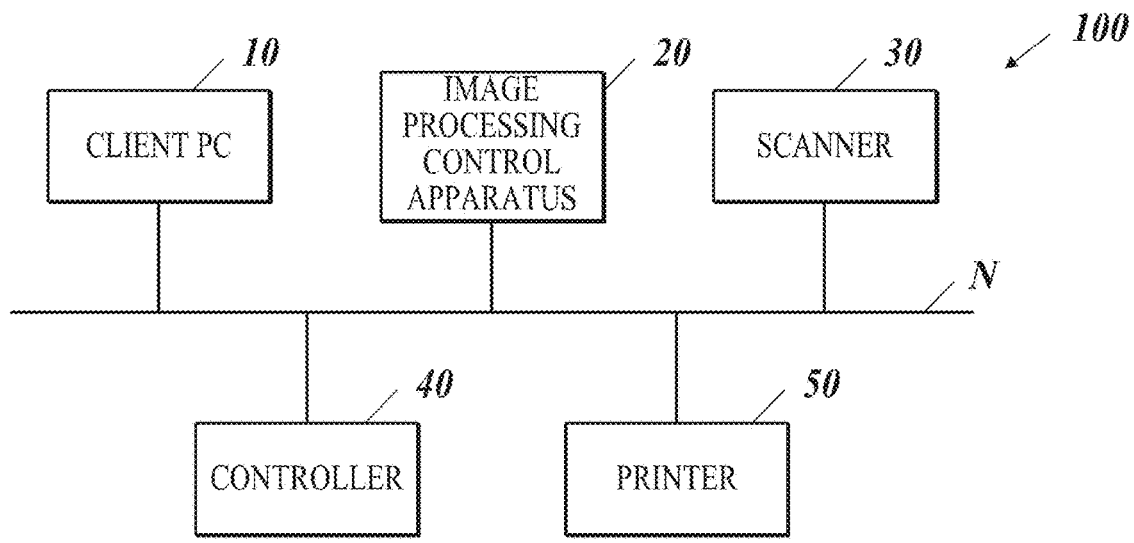
FIG. 1 is a diagram showing a systematic configuration of an image forming system.

FIG. 1 shows a systematic configuration of an image forming system 1. As shown in FIG. 1, the image forming system 100 includes a client personal computer (PC) 10, an image processing control apparatus 20, a scanner 30, a controller 40, and a printer 50. These components are connected to each other for data exchange through a communication network N, such as an intranet.

The client PC 10 sends, to the image processing control apparatus 20 or the controller 40, printing instructions including image data of an image to be printed.

The image processing control apparatus 20 is a computing apparatus that performs color adjustment so that the color of a material output by the printer 50 corresponds with the color of a color sample. The image processing control apparatus 20 stores a program(s) and data for color adjustment. The image processing control apparatus 20 may be operable with the client PC 10, or the client PC 10 may include functions of the image processing control apparatus 20.

The scanner 30 reads the color sample and generates read image data (values of R, G, and B (RGB values)) shown in a first color system (RGB color system). The scanner 30 may be a scanner provided to the printer 50 or a scanner provided on a sheet conveyance path of the printer 50.

The controller 40 performs arithmetic processes such as color conversion, rasterization, and screening on a print job issued by the client PC 10, generates raster data, and sends the raster data to the printer 50. The controller 40 may be included in the printer 50.

The printer 50 performs printing on the basis of the raster data (CMYK values) received from the controller 40. The printer 50 is an image forming apparatus that uses four process colors of cyan (C), magenta (M), yellow (Y), and black (K). The printer 50 forms an image on a sheet of paper using CMYK color materials such as toners or inks.

Figure 2:
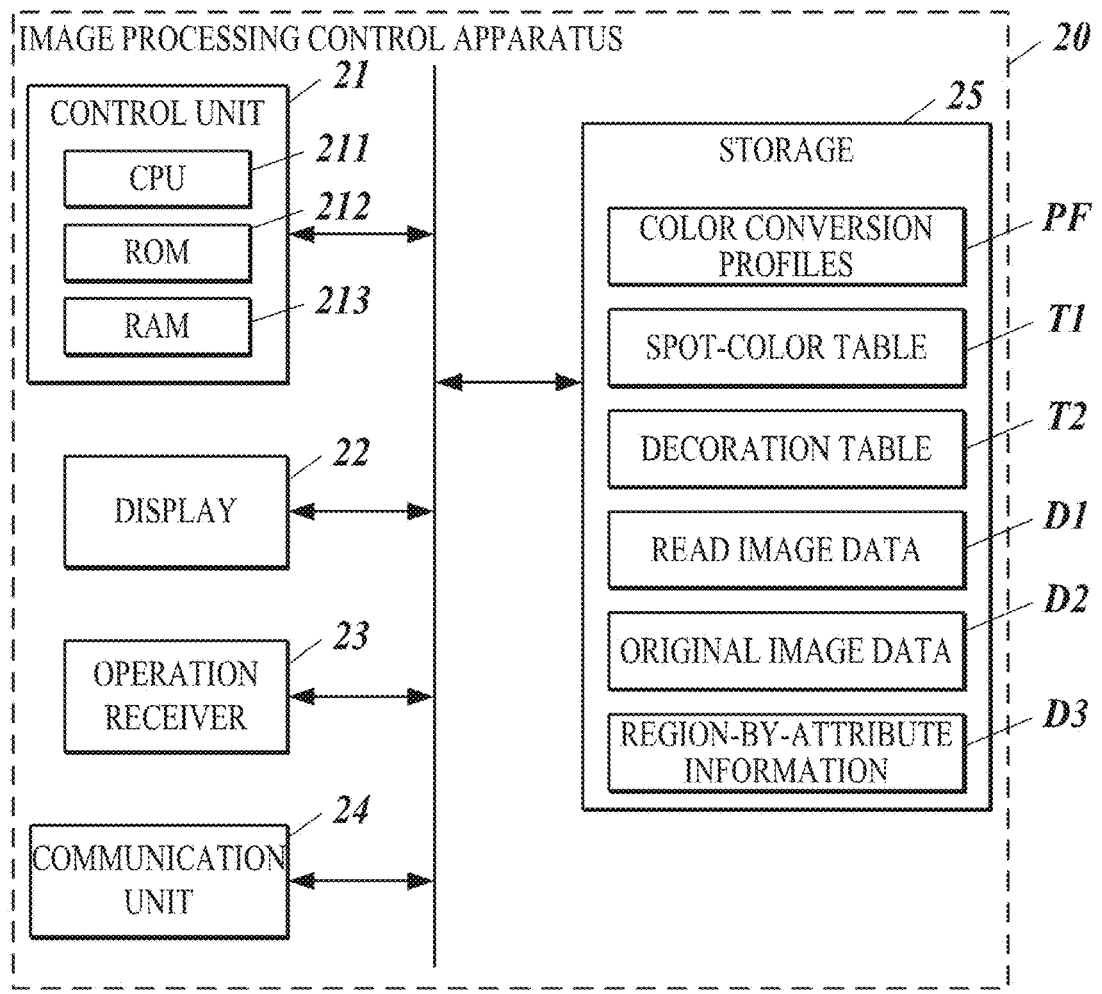
FIG. 2 is a block diagram showing a functional configuration of an image processing control apparatus.

FIG. 2 shows a functional configuration of the image processing control apparatus 20. As shown in FIG. 2, the image processing control apparatus 20 includes a control unit 21 (hardware processor), a display 22, an operation receiver 23, a communication unit 24, and a storage 25.

The control unit 21 includes a central processing unit (CPU) 211, a read only memory (ROM) 212, and a random access memory (RAM) 213, and integrally controls the components of the image processing control apparatus 20. The CPU 211 reads various programs stored in the ROM 212 or the storage 25, loads the read programs into the RAM 213, and performs various processes in accordance with the loaded programs. The ROM 212 is a read-only memory that stores various programs and data. The RAM 213 temporarily stores programs and/or data as a work area.

The display 22 includes a monitor such as a liquid crystal display (LCD) and displays various displays in accordance with instructions of display signals input by the control unit 21.

The operation receiver 23 includes a keyboard including cursor keys, character entry keys, and various function keys, and a pointing device such as a mouse. The operation receiver 23 outputs, to the control unit 21, operation signals input with key operations to the keyboard or mouse operations. The operation receiver 23 may include a touchscreen superposed on the display 22 and output, to the control unit 21, operation signals corresponding to the position of a touching operation with a finger of an operator or the like.

The communication unit 24 includes a network interface and performs data exchange with external apparatuses connected through the communication network N.

The storage 25 stores various programs and data.

As shown in FIG. 2, the storage 25 stores color conversion profiles PF, a spot-color table T1 as a first table, and a decoration table T2 as a second table. The storage 25 also stores read image data D1, original image data D2, and region-by-attribute information D3.

The color conversion profiles PF are profiles used for color conversion and include a scanner profile, a printer profile, and a target profile.

The spot-color table T1 is a table in which names of spot colors designated for spot-color printing are associated with spot-color correspondence values (CMYK values) shown in a second color system (CMYK color system).

Spot-color printing is a type of printing that uses a single color material such as a spot-color ink or a spot-color toner prepared separately from normal process colors. With respect to the printer 50 as a normal printer, however, spot-color printing also includes expression of a spot color with CMYK values corresponding to a designated spot-color name.

FIG. 3 exemplifies a data structure of the spot-color table T1. In the spot-color table T1, spot-color names in spot-color printing are associated with spot-color correspondence values (CMYK values) shown in the CMYK color system. For example, "spot color 1" is associated with C: 0.0%, M: 100.0%, Y: 68.7%, and K: 0.0%.

The decoration table T2 is a table in which decoration names designated for decoration printing are associated with decoration substitution values (CMYK values) shown in the second color system (CMYK color system).

Decoration printing is a type of printing that involves post processing after printing to obtain a highly decorative design. Decoration printing of wrapping paper is often performed through laminating metal leafs or depositing metal.

The decoration table T2 is used when substitution printing that uses CMYK process colors is performed instead of decoration printing that involves post processing.

The decoration table T2 may be recorded as part of the spot-color table T1.

FIG. 4 exemplifies a data structure of the decoration table T2. In the decoration table T2, decoration names in decoration printing are associated with decoration substitution values (CMYK values) shown in the CMYK color system. For example, "gold leaf A" is associated with C: 13.7%, M: 26.8%, Y: 76.9%, and K: 27.4%.

The color sample is often a printed matter having been printed through spot-color printing that uses spot-color inks or toners and/or through decoration printing that involves post processing. The color sample may be a matter printed and output in the past by the printer 50 using CMYK color materials.

The control unit 21 obtains, from the scanner 30, read image data D1 that is obtained through reading the color sample and shown in the first color system (RGB color system). That is, the control unit 21 functions as a first obtainment unit.

The control unit 21 obtains, from the client PC 10, original image data D2 that corresponds to the color sample and is shown in the second color system (CMYK color system). That is, the control unit 21 functions as a second obtainment unit. The original image data D2 is image data that was the source of printing the color sample. In the original image data D2, a spot-color name is designated for a first region corresponding to spot-color printing, and a decoration name is designated for a second region corresponding to decoration printing.

The control unit 21 obtains, from the client PC 10, region-by-attribute information D3 that indicates the first region (spot-color region) corresponding to spot-color printing and the second region (decoration region) corresponding to decoration printing. That is, the control unit 21 functions as a third obtainment unit. The region-by-attribute information D3 includes attributes indicating whether the respective pixels constituting the original image data D2 correspond to spot-color printing or decoration printing.

With respect to the first region and a third region (normal-color region) that is different from the first and second regions in the original image data D2, the control unit 21 determines color conversion parameters for color conversion of the original image data D2 by using the read image data D1.

With respect to the second region, the control unit 21 determines a color conversion parameter for color conversion of the original image data D2 according to predetermined values shown in the second color system (CMYK color system).

More specifically, the control unit 21 determines the color conversion parameter for the third region by correcting the color profile for color conversion of the original image data D2 according to the read image data D1 and the original image data D2 that correspond to the third region. Examples of the color profile include a target profile and a device link profile.

Further, the control unit 21 determines the color conversion parameter for the first region by: converting the read image data D1 corresponding to the first region into color values; converting the color values corresponding to the first region into spot-color correspondence values shown in the second color system (CMYK values); and generating the first table (spot-color table T1) in which the spot-color names in spot-color printing are associated with the spot-color correspondence values shown in the second color system (CMYK values). When an attribute is "spot-color printing", the control unit 21 corrects destination values (CMYK values) in the spot-color table T1 with the spot-color correspondence values (CMYK values), the destination values being for the spot-color name designated in the original image data D2 and the spot-color correspondence values being calculated from the read image data D1.

Further, the control unit 21 determines the color conversion parameter for the second region by obtaining, from the second table (decoration table T2), decoration substitution values associated with the decoration name being designated for the second region in the original image data D2. When an attribute is "decoration printing", the control unit 21 uses, as CMYK values in substitution printing, destination values (CMYK values) of the decoration name designated in the original image data D2.

The control unit 21 causes the display 22 to display an image(s) that is based on the read image data D1 or the original image data D2 such that the first region, the second region, or the third region is distinguishable. For example, the control unit 21 changes colors/patterns of regions or colors/types of borderlines between the regions by attributes (spot-color printing, decoration printing, and normal color) to which the respective regions are associated with.

In the image that is based on the read image data D1 or the original image data D2, the control unit 21 causes the display 22 to display the second region according to the predetermined values shown in the second color system (CMYK values). More specifically, the control unit 21 obtains, from the decoration table T2, decoration substitution values (CMYK values) associated with the decoration name designated for decoration printing. The control unit 21 then causes the display 22 to display the second region with a color (for example, gold or silver) corresponding to the decoration substitution values.

The control unit 21 receives, from the operation receiver 23 operated by the user, setting of predetermined values shown in the second color system (CMYK values) for the second region corresponding to decoration printing. For example, the control unit 21 receives, from the operation receiver 23, addition of a new combination of a decoration name and decoration substitution values (CMYK values), and records the combination in the decoration table T2. Further, the control unit 21 receives, from the operation receiver 23, correction of decoration substitution values (CMYK values) associated with a decoration name that has been recorded, and stores the corrected decoration substitution values in the decoration table T2.

With respect to the second region corresponding to decoration printing, the control unit 21 receives, from the operation receiver 23 operated by the user, a choice about whether to perform substitution printing that uses predetermined values shown in the second color system (CMYK values) or decoration printing that involves post processing. With respect to the second region corresponding to decoration printing, post processing may be chosen as well as substitution printing with the printer 50 using CMYK color materials. The post processing is performed through lamination of metal leafs or deposition of metal, for example.

Next, operation of the image processing control apparatus 20 is explained.

Figure 5:
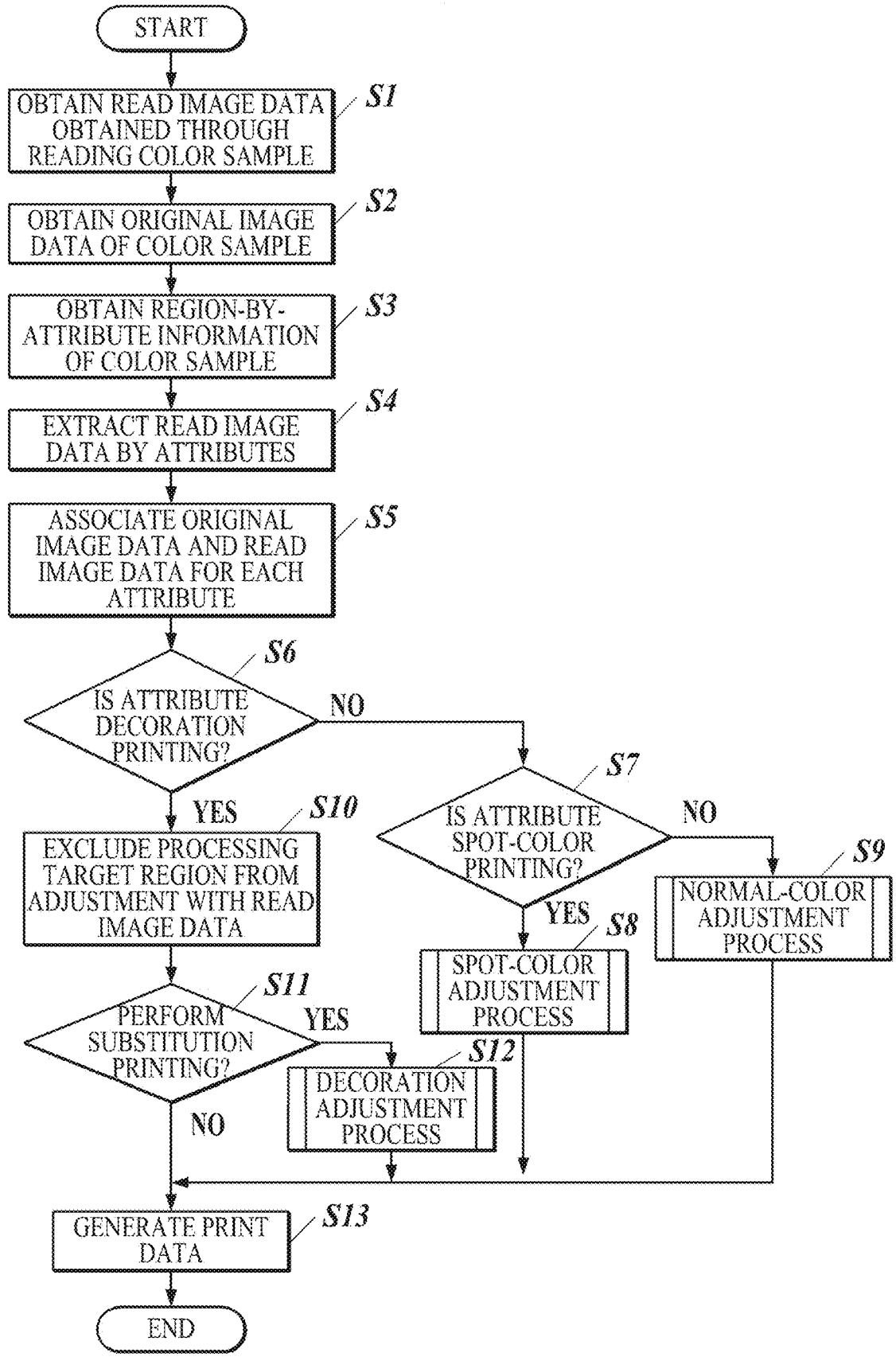
FIG. 5 is a flowchart showing a color adjustment process performed by the image processing control apparatus.

FIG. 5 is a flowchart showing a color adjustment process performed by the image processing control apparatus 20. The process is realized by software processing that is performed by the CPU 211 of the control unit 21 in cooperation with a program(s) stored in the storage 25.

First, the scanner 30 reads a color sample and generates read image data D1 shown in the RGB color system.

The control unit 21 obtains, from the scanner 30 via the communication unit 24, the read image data (RGB values) D1 obtained through reading the color sample (Step S1). The control unit 21 causes the storage 25 to store the obtained read image data D1.

Next, the control unit 21 obtains, from the client PC 10 via the communication unit 24, original image data D2 (CMYK values) corresponding to the color sample and shown in the CMYK color system (Step S2). The control unit 21 causes the storage 25 to store the obtained original image data D2.

Next, the control unit 21 obtains, from the client PC 10 via the communication unit 24, region-by-attribute information D3 of the original image data D2 corresponding to the color sample (Step S3). According to the region-by-attribute information D3, the control unit 21 can determine correspondences between regions in the original image data D2 and attributes including spot-color printing, decoration printing, and other (normal color). The control unit 21 causes the storage 25 to store the obtained region-by-attribute information D3.

Next, the control unit 21 extracts portions of the read image data D1 by attributes (Step S4). More specifically, the control unit 21 extracts corresponding portions in the read image data D1 respectively for the first region corresponding to spot-color printing, the second region corresponding to decoration printing, and the third region that is different from the first and second regions.

Next, for each attribute, the control unit 21 associates the original image data D2 with the read image data D1 both of which correspond to the same color sample, and performs registration of the original image data D2 and the read image data D1 (Step S5).

Next, the control unit 21 determines whether or not the attribute of a region as a processing target (processing target region) is "decoration printing" (Step S6). That is, the control unit 21 determines whether or not the attribute of the processing target region is excluded from color adjustment with the read image data D1.

If the attribute of the processing target region is not "decoration printing" (Step S6: NO), the control unit 21 determines whether or not the attribute of the processing target region is "spot-color printing" (Step S7).

If the attribute of the processing target region is "spot-color printing" (Step S7: YES), namely the processing target region is the first region, the control unit 21 performs a spot-color adjustment process (Step S8), the details of which are described later.

In Step S7, if the attribute of the processing target region is not "spot-color printing" (Step S7: NO), namely the processing target region is the third region, the control unit 21 performs a normal-color adjustment process (Step S9), the details of which are described later.

In Step S6, if the attribute of the processing target region is "decoration printing" (Step S6: YES), namely the processing target region is the second region, the control unit 21 excludes the processing target region from the color adjustment with the read image data D1 (Step S10).

Next, the control unit 21 determines whether or not the user chooses, by operating the operation receiver 23, to perform substitution printing for decoration printing (Step S11).

If substitution printing is chosen to be performed for decoration printing (Step S11: YES), the control unit 21 performs a decoration adjustment process (Step S12), the details of which are described later.

In Step S11, if substitution printing is not chosen to be performed for decoration printing (Step S11: NO), namely decoration printing that involves post processing is chosen to be performed, the control unit 21 generates print data after Step S8, S9, or S12 (Step S13). The control unit 21 performs, using the color conversion parameters determined for the respective attributes, color conversion of the original image data D2 according to the color sample, thereby generating CMYK values to output to the controller 40.

Then, the color adjustment process ends.

The image data (CMYK values) generated by the image processing control apparatus 20 is sent to the controller 40, and various kinds of processing is performed on the image data by the controller 40. The image data is then sent to the printer 50. The printer 50 performs printing on the basis of raster data (CMYK values).

If decoration printing that involves post processing is chosen to be performed (Step S11: NO), the printer 50 outputs a printed matter on which the second region (decoration region) is not printed.

In Step S11 in the above color adjustment process, the user is allowed to choose, for the second region, whether to perform substitution printing that uses predetermined values (decoration substitution values) shown in the CMYK color system or decoration printing that involves post processing. However, determination on the choice may be made on the basis of preset setting information.

Figure 6:
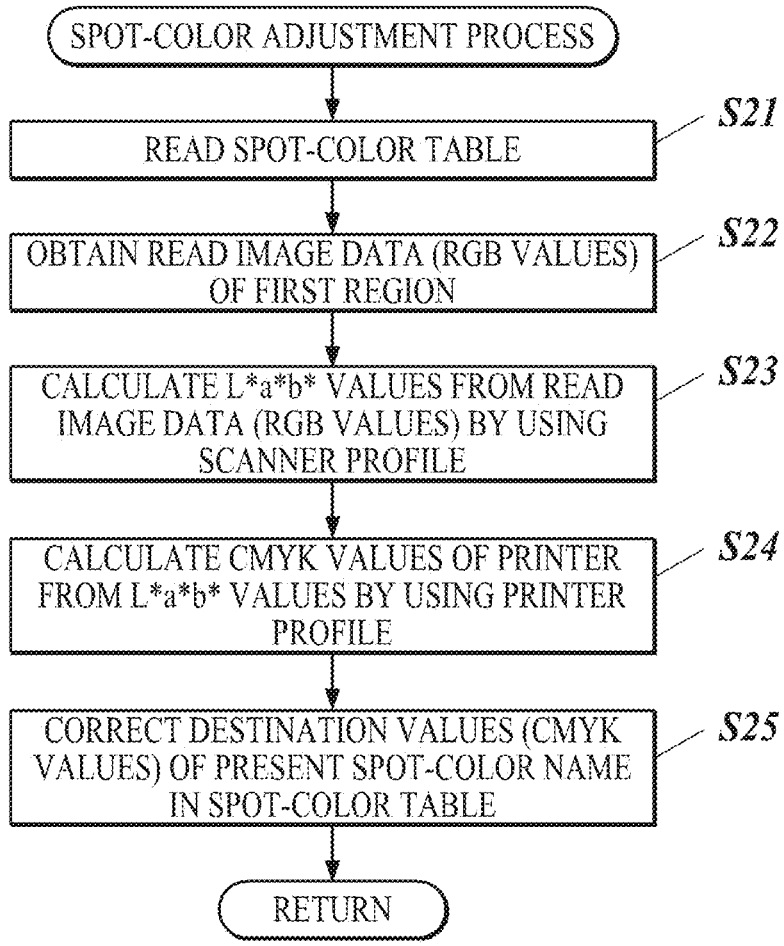
FIG. 6 is a flowchart showing a spot-color adjustment process.

FIG. 6 is a flowchart showing the spot-color adjustment process (Step S8 in FIG. 5).

When the attribute of the processing target region is "spot-color printing", the control unit 21 performs adjustment using the read image data D1 of the first region (spot-color region).

First, the control unit 21 reads out the spot-color table T1 from the storage 25 (Step S21).

Next, the control unit 21 obtains the read image data D1 (RGB values) corresponding to the first region and extracted in Step S4 (Step S22).

Next, the control unit 21 calculates, by using a scanner profile of the scanner 30, values of L*, a*, and b* (L*a*b* values) as color values from the read image data D1 (RGB values) corresponding to the first region (Step S23). The scanner profile is a profile showing input characteristics of the scanner 30. In the scanner profile, each combination of R, G, and B values to be output by the scanner 30 is associated with the corresponding combination of color values (L*, a*, and b* values).

Next, the control unit 21 calculates, by using a printer profile of the printer 50 to be used for printing, CMYK values for the printer 40 from the L*a*b* values calculated in Step S23 (Step S24). The printer profile is a profile showing output characteristics of the printer 50. In the printer profile, each combination of color values (L*, a*, and b* values) is associated with the corresponding combination of C, M, Y, and K values to be output by the printer 50 so that a color corresponding to the combination of color values (L*, a*, and b* values) is produced.

Next, the control unit 21 corrects destination values of the spot-color name in the spot-color table T1 to be the CMYK values calculated in Step S24 (Step S25). The control unit 21 saves the spot-color table T1 with the corrected content in the storage 25.

Then, the spot-color adjustment process ends.

Generating (correcting) the spot-color table T1, in which spot-color names in spot-color printing are associated with spot-color correspondence values (CMYK values), corresponds to determining the color conversion parameter for the first region. That is, the corrected spot-color table T1 is used for color conversion of the first region in the original image data D2.

When generating print data from the original image data D2 (Step S13), the control unit 21 refers to the spot-color table T1, obtains spot-color correspondence values (CMYK values) associated with the spot-color name designated for the first region, and determines the spot-color correspondence values as the color conversion result.

Figure 7:
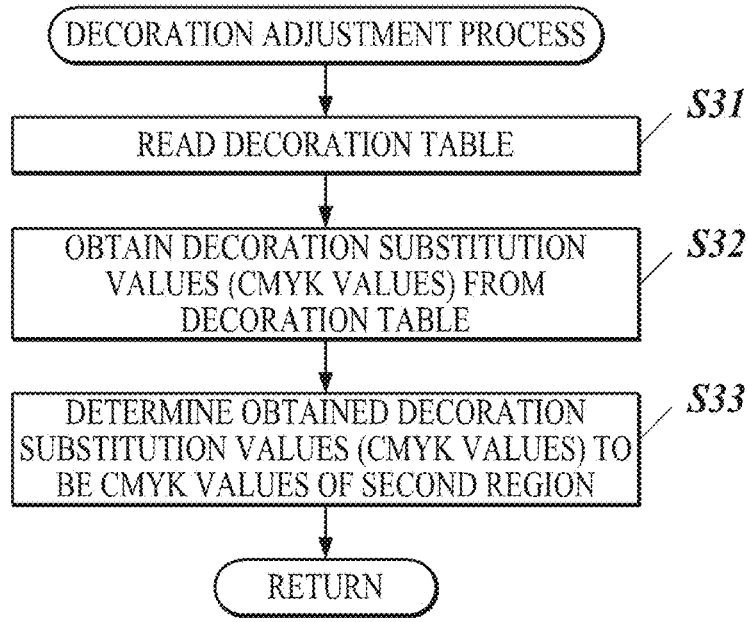
FIG. 7 is a flowchart showing a decoration adjustment process.

FIG. 7 is a flowchart showing the decoration adjustment process (Step S12 in FIG. 5).

If the attribute of the processing target region is "decoration printing", and substitution printing is performed instead of post processing, the control unit 21 uses the decoration table T2 recorded beforehand, instead of performing adjustments using the read image data D1 of the second region (decoration region).

First, the control unit 21 reads the decoration table T2 from the storage 25 (Step S31).

Next, the control unit 21 obtains, from the decoration table T2, decoration substitution values (CMYK values) associated with the decoration name designated for the second region in the original image data D2 (Step S32).

Next, the control unit 21 determines the obtained decoration substitution values (CMYK values) to be CMYK values of the second region (Step S33).

Then, the decoration adjustment process ends.

Obtaining, from the decoration table T2, decoration substitution values (CMYK values) associated with the decoration name designated for the second region in the original image data D2 corresponds to determining the color conversion parameter for the second region. That is, the decoration table T2 is used for color conversion of the second region in the original image data D2.

When generating the print data from the original image data D2 (Step S13), the control unit 21 refers to the decoration table T2, obtains decoration substitution values (CMYK values) associated with the decoration name designated for the second region, and determines the decoration substitution values as the color conversion result.

Figure 8:
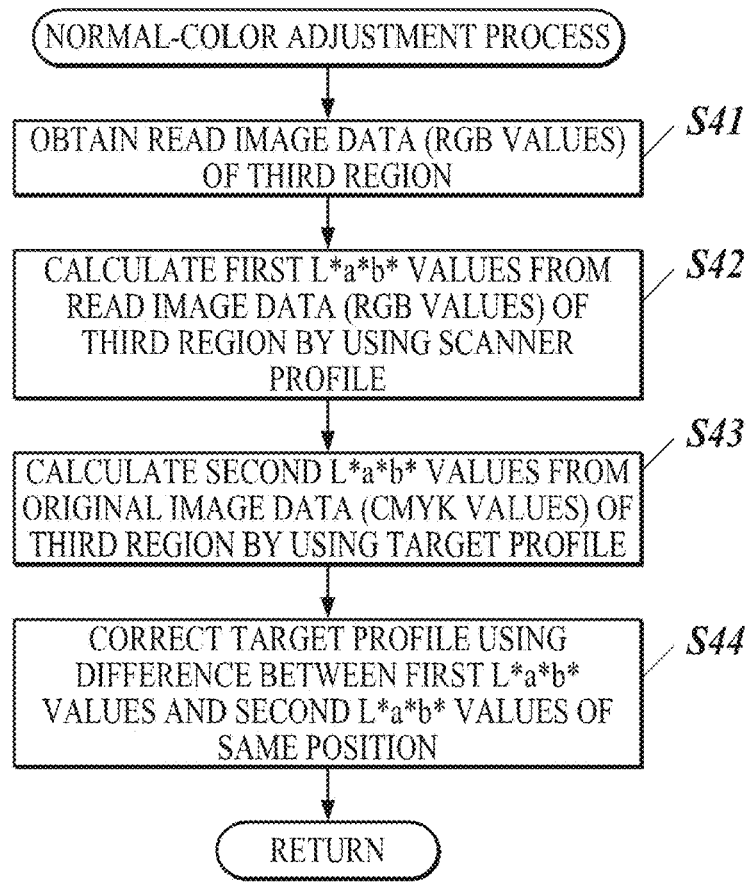
FIG. 8 is a flowchart showing a normal-color adjustment process.

FIG. 8 is a flowchart showing a normal-color adjustment process (Step S9 in FIG. 5).

If the attribute of the processing target region is "normal color", which is different from spot-color printing and decoration printing, the control unit 21 performs adjustment using the read image data D1 of the third region (normal-color region).

First, the control unit 21 obtains the read image data D1 (RGB values) corresponding to the third region and extracted in Step S4 (Step S41).

Next, the control unit 21 calculates, by using the scanner profile of the scanner 30, first L*a*b* values as color values from the read image data D1 (RGB values) corresponding to the third region (Step S42).

Next, the control unit 21 calculates, by using a target profile, second L*a*b* values as color values from the original image data D2 (CMYK values) corresponding to the third region (Step S43). The target profile is a profile defining a color that is targeted with respect to the color sample (e.g. Japan Color).

Next, the control unit 21 corrects the target profile by using differences between the first and second L*a*b* values of the same position (Step S44). More specifically, the control unit 21 corrects the target profile so that CMYK values of each position in the original image data D2 are converted into the first L*a*b* values of the corresponding position in the read image data D1, which has been obtained through reading the color sample.

Then, the normal-color adjustment process ends.

Correcting the target profile for color conversion of the original image data D2 on the basis of the read image data D1 and the original image data D2 that correspond to the third region corresponds to determining the color conversion parameter for the third region. That is, the corrected target profile is used for color conversion of the third region in the original image data D2.

When generating the print data from the original image data D2 (Step S13), the control unit 21 converts, by using the target profile having been adjusted with the read image data D1, CMYK values of the original image data D2 corresponding to the third region into L*a*b* values. The control unit 21 then converts, by using the printer profile of the printer 50, the L*a*b* values into CMYK values that are determined as the color conversion result.

Figure 9:
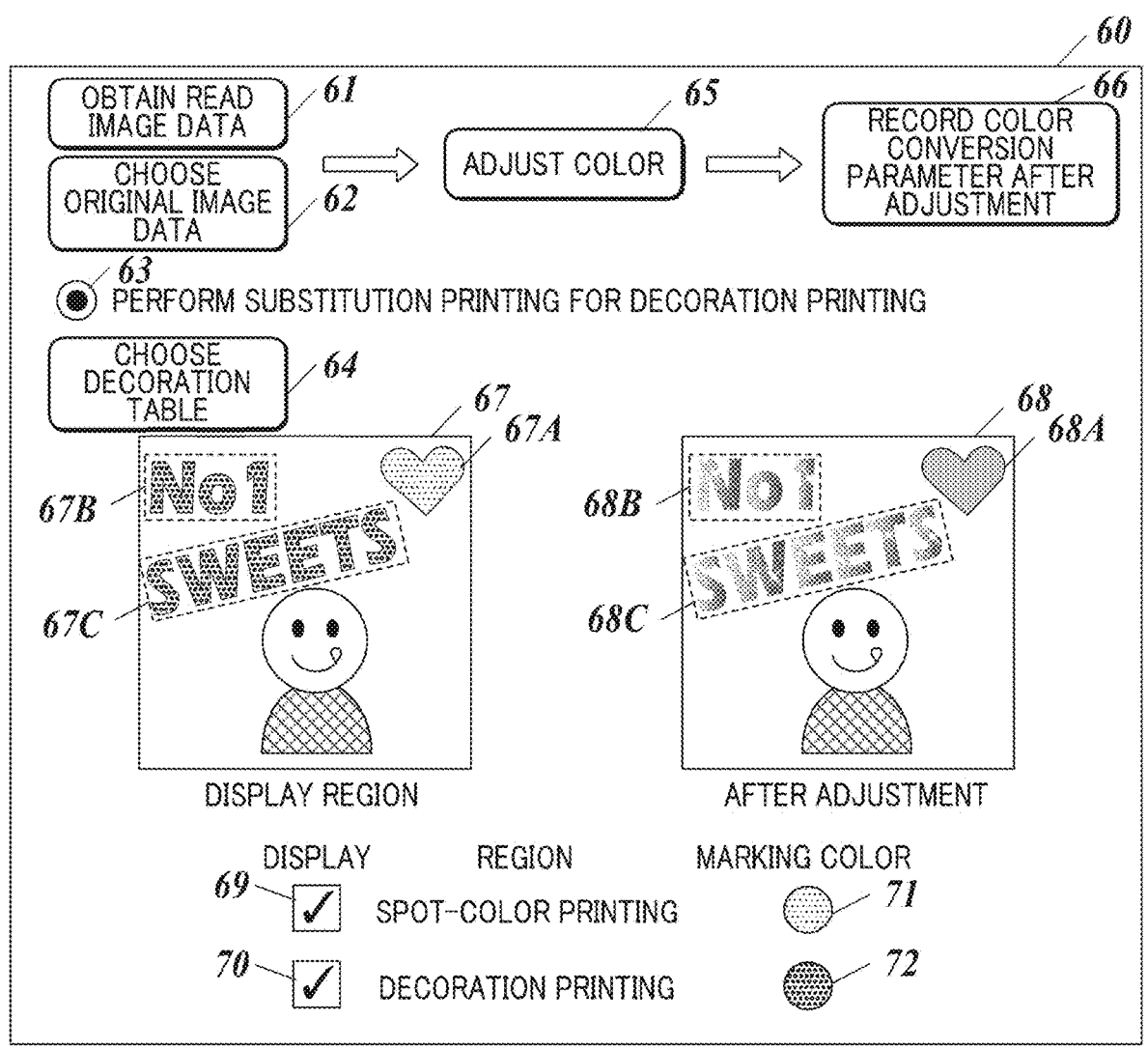
FIG. 9 exemplifies an adjustment screen displayed on the image processing control apparatus.

FIG. 9 exemplifies an adjustment screen 60 displayed on the display 22 of the image processing control apparatus 20.

The adjustment screen 60 includes a read-image-data obtainment button 61, an original-image-data choosing button 62, a substitution-printing choosing radio button 63, a decoration-table choosing button 64, a color adjustment button 65, an after-adjustment color-conversion-parameter recording button 66, a region-by-attribute display section 67, an after-adjustment image display section 68, a spot-color region checkbox 69, a decoration region checkbox 70, a spot-color marking color display section 71, and a decoration marking color display section 72.

The read-image-data obtainment button 61 is a button for making an instruction to obtain read image data D1. When a user presses the read-image-data obtainment button 61 by operating the operation receiver 23, the control unit 21 obtains the read image data D1 from the scanner 30. This corresponds to Step S1 in FIG. 5.

The original-image-data choosing button 62 is a button for choosing original image data D2 corresponding to a color sample. When the user presses the original-image-data choosing button 62 by operating the operation receiver 23, the control unit 21 causes the display 22 to display candidates of the original image data D2 corresponding to the color sample. When the user chooses any of the candidates of the original image data D2 being displayed on the display 22 by operating the operation receiver 23, the control unit 21 obtains, from the client PC 10, the chosen original image data D2 and region-by-attribute information D3 corresponding to the chosen original image data D2. This corresponds to Steps S2 and S3 in FIG. 5.

The substitution-printing choosing radio button 63 is a button for choosing whether or not to perform substitution printing of decoration printing for the second region corresponding to decoration printing in the original image data D2. When the user turns on the substitution-printing choosing radio button 63 (corresponding to Step S11: YES in FIG. 5) by operating the operation receiver 23, the control unit 21 determines to perform substitution printing for the second region (corresponding to Step S12 in FIG. 5). When the user turns off the substitution-printing choosing radio button 63 by operating the operation receiver 23 (corresponding to Step S11: NO in FIG. 5), the control unit 21 determines not to print the second region but to decorate the second region by performing post processing after the printer 50 outputs a printed matter.

In the adjustment screen 60 of FIG. 9, the substitution-printing choosing radio button 63 is used to choose whether or not to perform substitution printing for decoration printing. This is not the limitation, though. Any function may be applicable as long as the function allows the user to choose whether or not to perform substitution printing for decoration printing.

The decoration-table choosing button 64 is a button for manually choosing a decoration name from the decoration table T2. When the user presses the decoration-table choosing button 64 by operating the operation receiver 23, the control unit 21 causes the display 22 to display decoration names included in the decoration table T2. When the user chooses any of the decoration names displayed on the display 22 by operating the operation receiver 23, the control unit 21 determines, as the color conversion parameter for the second region in the original image data D2, the decoration substitution values (CMYK values) associated with the chosen decoration name. Thus, when an optimum decoration name cannot be automatically chosen according to information designated in the original image data D2, the user can manually choose an optimum decoration name from the decoration table T2.

A new combination of a decoration name and decoration substitution values (CMYK values) may be added to the decoration table T2, or decoration substitution values (CMYK values) associated with a decoration name may be corrected through operation of the operation receiver 23. A decoration name may be chosen from the decoration table T2 after the addition and correction are received.

The color adjustment button 65 is a button for making instruction to perform color adjustment on the original image data D2 according to the color sample. When the user presses the color adjustment button 65 by operating the operation receiver 23, the control unit 21 performs the process of Step S4 and the following processes in FIG. 5. That is, the control unit 21 performs the color adjustment process for each attribute.

The after-adjustment color-conversion-parameter recording button 66 is a button for recording the color conversion parameters after adjustment. When the user presses, after the color adjustment process finishes, the after-adjustment color-conversion-parameter recording button 66 by operating the operation receiver 23, the control unit 21 records the adjusted color conversion parameters (color conversion profiles PF and spot-color table T1) in the storage 25.

In the region-by-attribute display section 67, an image based on the original image data D2 is displayed. The region-by-attribute display section 67 has functions of displaying the first region 67A corresponding to spot-color printing and the second region 67B, 67C corresponding to decoration printing so as to be distinguishable, as desired by the user.

The third region, which is different from the first region 67A and the second region 67B, 67C, is also distinguishable when the first region 67A and the second region 67B, 67C are displayed to be distinguishable.

In the after-adjustment image display section 68, an image based on the original image data D2 on which color conversion has been performed with the adjusted color conversion parameters is displayed.

The spot-color region checkbox 69 is a checkbox for choosing to display the first region distinguishably in the color shown in the spot-color marking color display section 71.

The decoration region checkbox 70 is a checkbox for choosing to display the second region distinguishably in the color shown in the decoration marking color display section 72.

In the spot-color marking color display section 71, a color indicating the first region is displayed.

In the decoration marking color display section 72, a color indicating the second region is displayed.

The user can change colors indicating the first and second regions as desired.

When the user checks the spot-color region checkbox 69, in the region-by-attribute display section 67, the first region 67A is displayed in the color shown in the spot-color marking color display section 71.

When the user checks the decoration region checkbox 70, in the region-by-attribute display section 67, the second region 67B, 67C is displayed in the color shown in the decoration marking color display section 72.

A marking method is not limited to this, and another marking method is applicable as long as the first region 67A and the second region 67B, 67C can be displayed distinguishably.

In the after-adjustment image display section 68, the first region 68A is displayed in the color corresponding to the spot-color correspondence values (CMYK values) obtained from the spot-color table T1 that has been adjusted with the read image data D1.

When the substitution-printing choosing radio button 63 is on, in the after-adjustment image display section 68, the second region 68B, 68C is displayed in the color (color being close to gold or silver) corresponding to the decoration substitution values (CMYK values) obtained from the decoration table T2.

With respect to the third region, which is different from the first region 68A and the second region 68B, 68C, the control unit 21 generates CMYK values to output to the controller 40 by using the target profile (CMYK values to L*a*b* values) having been adjusted with the read image data D1 and the printer profile (L*a*b* values to CMYK values) of the printer 50. In the after-adjustment image display section 68, the third region is displayed in the color corresponding to the generated CMYK values.

The respective buttons on the adjustment screen 60 may be displayed at a timing when the user's operation instruction is required to proceed with the process.

As described above, according to the embodiment, the image processing control apparatus 20 obtains: the read image data D1 obtained by the normal scanner 30 reading the color sample that includes a spot-color(s) and/or decoration; and original image data D2 and region-by-attribute information D3 that correspond to the color sample. For each attribute, the image processing control apparatus 20 extracts the read image data D1, determines whether or not to use the read image data D1 in color adjustment, and performs an appropriate color adjustment process. This makes it possible to obtain an output matter having high color reproduction accuracy without using a scanner provided with a special member(s) capable of distinguishing metal colors. Hence, decrease in color reproduction accuracy can be restrained in performing printing according to the color sample that includes a spot-color(s) and/or decoration. Use of the color conversion parameters adjusted for the respective attributes enables printing so as to correspond with the color sample.

More specifically, the control unit 21 determines, by using the read image data D1, the color conversion parameter for color conversion of the third region (normal-color region) in the original image data D2. This can realize a color that corresponds with the color sample.

Furthermore, the control unit 21 determines the color conversion parameter for the first region by generating, with the read image data D1, the spot-color table T1. This can produce a color that corresponds with the color sample.

Furthermore, the control unit 21 determines the color conversion parameter for the second region (decoration region) by obtaining decoration substitution values from the decoration table T2, without using the read image data D1. Thus, for a color being difficult for the scanner 30 to read (e.g., color having a metallic luster), decoration substitution values prepared beforehand can be used.

Furthermore, in the region-by-attribute display section 67 of the adjustment screen 60 (see FIG. 9), the control unit 21 causes the display 22 to display the first region 67A, the second region 67B, 67C, and the third region so as to be distinguishable. This allows the user to recognize the range of each region.

Furthermore, in the after-adjustment image display section 68 of the adjustment screen 60 (see FIG. 9), the control unit 21 causes the display 22 to display the second region 68B, 68C on the basis of the predetermined values shown in CMYK values (decoration substitution values). This allows the user to check what the result of substitution printing will be like.

In the region-by-attribute display section 67 and the after-adjustment image display section 68 of the adjustment screen 60, images based on the original image data D2 are displayed. Instead, images based on the read image data D1 may be displayed.

Furthermore, in response to the user's operation, predetermined values (decoration substitution values) shown in CMYK values for the second region corresponding to decoration printing are set. Thus, decoration substitution values can be added or corrected for the respective decoration names.

Furthermore, with respect to the second region corresponding to decoration printing, the user can choose whether to perform substitution printing that uses predetermined values shown in CMYK values or decoration printing that involves post processing. Thus, printing can be performed in the manner the user desires.

The above-described embodiment is an example of the image processing control apparatus according to the present invention and does not limit the present invention. Detailed configuration and detailed operation of each of the components consisting the apparatus can be appropriately modified without departing from the scope of the present invention.

For example, in the above embodiment, the RGB color system and the CMYK color system are used as the first and second color systems, respectively. However, another color system may be used as the first or second color system.

Further, although L*a*b* values are used as color values in color adjustment, values of X, Y, and Z may be used, for example.

Further, the adjustment screen 60 shown in FIG. 9 exemplifies a case where the first region 67A corresponding to spot-color printing and the second region 67B, 67C corresponding to decoration printing are displayed in their designated marking colors. The third region may be displayed in a designated color or pattern.

Further, in the above embodiment, at Step S44 in the normal-color adjustment process shown in FIG. 8, the target profile is corrected. In addition to this, the corrected target profile (CMYK values to L*a*b* values) may be combined with the printer profile (L*a*b* values to CMYK values) to generate a device link profile (CMYK values to CMYK values). In this case, the generated device link profile may be used to perform color conversion of the third region in the original image data D2.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing control apparatus comprising a hardware processor that obtains:
   read image data obtained through reading a color sample and shown in a first color system;
   original image data corresponding to the color sample and shown in a second color system; and
   region-by-attribute information indicating a first region corresponding to spot-color printing and a second region corresponding to decoration printing, the first and second regions being in the original image data,
   wherein the hardware processor
   determines a color conversion parameter for color conversion of the first region and a color conversion parameter for color conversion of a third region different from the first and second regions in the original image data by using the read image data, and
   determines a color conversion parameter for color conversion of the second region according to predetermined values shown in the second color system.

2. The image processing control apparatus according to claim 1, wherein the hardware processor determines the color conversion parameter for the third region by correcting a color profile for color conversion of the original image data according to the read image data and the original image data that correspond to the third region.

3. The image processing control apparatus according to claim 1, wherein the hardware processor determines the color conversion parameter for the first region by
converting the read image data corresponding to the first region into color values,
converting the color values corresponding to the first region into spot-color correspondence values shown in the second color system, and
generating a first table in which a spot-color name in spot-color printing is associated with the spot-color correspondence values shown in the second color system.

4. The image processing control apparatus according to claim 1, wherein
a second table in which a decoration name in decoration printing is associated with decoration substitution values shown in the second color system is prepared beforehand, and
the hardware processor determines the color conversion parameter for the second region by obtaining, from the second table, the decoration substitution values associated with the decoration name being designated for the second region in the original image data.

5. The image processing control apparatus according to claim 1, wherein the hardware processor causes a display to display an image based on the read image data or the original image data such that the first region, the second region, or the third region is distinguishable.

6. The image processing control apparatus according to claim 5, wherein the hardware processor causes the display to display, in the image based on the read image data or the original image data, the second region according to the predetermined values shown in the second color system.

7. The image processing control apparatus according to claim 5, further comprising an operation receiver that receives setting of the predetermined values shown in the second color system for the second region corresponding to decoration printing.

8. The image processing control apparatus according to claim 5, further comprising an operation receiver that receives, for the second region corresponding to decoration printing, a choice about whether to perform substitution printing that uses the predetermined values shown in the second color system or decoration printing that involves post processing.

9. A color adjustment method comprising:
obtaining read image data obtained through reading a color sample and shown in a first color system;
obtaining original image data corresponding to the color sample and shown in a second color system;
obtaining region-by-attribute information indicating a first region corresponding to spot-color printing and a second region corresponding to decoration printing, the first and second regions being in the original image data;
determining a color conversion parameter for color conversion of the first region and a color conversion parameter for color conversion of a third region different from the first and second regions in the original image data by using the read image data; and
determining a color conversion parameter for color conversion of the second region according to predetermined values shown in the second color system.

10. A non-transitory computer-readable storage medium storing a program that causes a computer to perform:
obtaining read image data obtained through reading a color sample and shown in a first color system;
obtaining original image data corresponding to the color sample and shown in a second color system;
obtaining region-by-attribute information indicating a first region corresponding to spot-color printing and a second region corresponding to decoration printing, the first and second regions being in the original image data;
determining a color conversion parameter for color conversion of the first region and a color conversion parameter for color conversion of a third region different from the first and second regions in the original image data by using the read image data; and
determining a color conversion parameter for color conversion of the second region according to predetermined values shown in the second color system.

* * * * *